US010783150B2

(12) United States Patent
Bernhardt

(10) Patent No.: US 10,783,150 B2
(45) Date of Patent: Sep. 22, 2020

(54) SYSTEMS AND METHODS FOR SOCIAL NETWORK POST AUDIENCE PREDICTION AND SELECTION

(71) Applicant: Facebook, Inc., Menlo Park, CA (US)

(72) Inventor: Daniel Bernhardt, London (GB)

(73) Assignee: Facebook, Inc., Menlo Park, CA (US)

( * ) Notice: Subject to any disclaimer, the term of this patent is extended or adjusted under 35 U.S.C. 154(b) by 1040 days.

(21) Appl. No.: 14/981,702

(22) Filed: Dec. 28, 2015

(65) Prior Publication Data

US 2017/0185903 A1 Jun. 29, 2017

(51) Int. Cl.
*G06F 16/24* (2019.01)
*G06F 16/2457* (2019.01)
*H04L 12/58* (2006.01)
*H04L 29/08* (2006.01)
*G06F 16/951* (2019.01)
*G06N 20/00* (2019.01)

(52) U.S. Cl.
CPC ...... *G06F 16/24578* (2019.01); *G06F 16/951* (2019.01); *H04L 51/32* (2013.01); *H04L 67/22* (2013.01); *G06N 20/00* (2019.01)

(58) Field of Classification Search
CPC ... G06N 5/04; G06F 16/24578; G06F 16/951; G06F 17/3053; H04L 51/32; H04L 67/22; H04L 29/08; H04L 12/58
USPC .......................................................... 706/46
See application file for complete search history.

(56) References Cited

U.S. PATENT DOCUMENTS

| | | | | |
|---|---|---|---|---|
| 2012/0005224 | A1* | 1/2012 | Ahrens | H04W 4/21 707/769 |
| 2013/0103758 | A1* | 4/2013 | Alison | G06Q 30/02 709/204 |
| 2013/0212173 | A1* | 8/2013 | Carthcart | G06Q 50/01 709/204 |
| 2013/0275429 | A1* | 10/2013 | York | G06Q 50/01 707/737 |
| 2014/0067546 | A1* | 3/2014 | Pike | G06Q 50/01 705/14.66 |
| 2014/0067964 | A1* | 3/2014 | Grishaver | G06Q 50/01 709/206 |
| 2015/0278367 | A1* | 10/2015 | Chang | G06F 16/9535 707/723 |
| 2015/0304373 | A1* | 10/2015 | Schleier-Smith | G06F 16/9535 715/753 |
| 2017/0177673 | A1* | 6/2017 | Bolshinsky | H04L 51/32 |

* cited by examiner

*Primary Examiner* — Dave Misir
(74) *Attorney, Agent, or Firm* — Sheppard Mullin Richter & Hampton LLP

(57) ABSTRACT

Systems, methods, and non-transitory computer-readable media can receive a social network post associated with a poster. The social network post is analyzed, and one or more potential viewers are ranked based on viewer ranking criteria. A predicted relevant audience is determined based on the ranking of the one or more potential viewers.

19 Claims, 7 Drawing Sheets

SYSTEMS AND METHODS FOR SOCIAL NETWORK POST AUDIENCE PREDICTION AND SELECTION

FIELD OF THE INVENTION

The present technology relates to the field of social networks. More particularly, the present technology relates to techniques for predicting and selecting a relevant audience for a post on a social networking system.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

User experience associated with a social networking system can be enhanced as the social networking system becomes more knowledgeable about the users that it serves. Such potentially helpful knowledge about a user can include information about the user as an individual as well as the user's actions on the social networking system. This information can be leveraged by the social networking system to optimize content and services offered to the user. More actions performed by the user on the social networking system, such as posting content to the social networking system, can offer more insights to further optimize the provision of content and services to the user.

SUMMARY

Various embodiments of the present disclosure can include systems, methods, and non-transitory computer readable media configured to receive a social network post associated with a poster. The social network post is analyzed, and one or more potential viewers are ranked based on viewer ranking criteria. A predicted relevant audience is determined based on the ranking the one or more potential viewers.

In an embodiment, the ranking the one or more potential viewers based on viewer ranking criteria comprises assigning an interest-level rating to each of the one or more potential viewers.

In an embodiment, the predicted relevant audience comprises each of the one or more potential viewers having an interest-level rating above an interest-level threshold.

In an embodiment, the predicted relevant audience comprises each of the one or more potential viewers ranked above a ranking threshold.

In an embodiment, a selected audience is received based on confirmation or revision of the predicted relevant audience.

In an embodiment, the receiving the selected audience comprises revising the predicted relevant audience by changing a ranking threshold.

In an embodiment, additional potential viewers that are not a part of the predicted relevant audience are suggested for the selected audience.

In an embodiment, the suggesting additional potential viewers that are not a part of the predicted relevant audience for the selected audience is based on a common category detected in the predicted relevant audience.

In an embodiment, the analyzing the social network post comprises determining post information, including at least one of location information, participant information, and content information; and ranking one or more potential viewers based on viewer ranking criteria comprises ranking one or more potential viewers based on the post information.

In an embodiment, the viewer ranking criteria comprise at least one of: a friendship coefficient or a potential interest determination.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
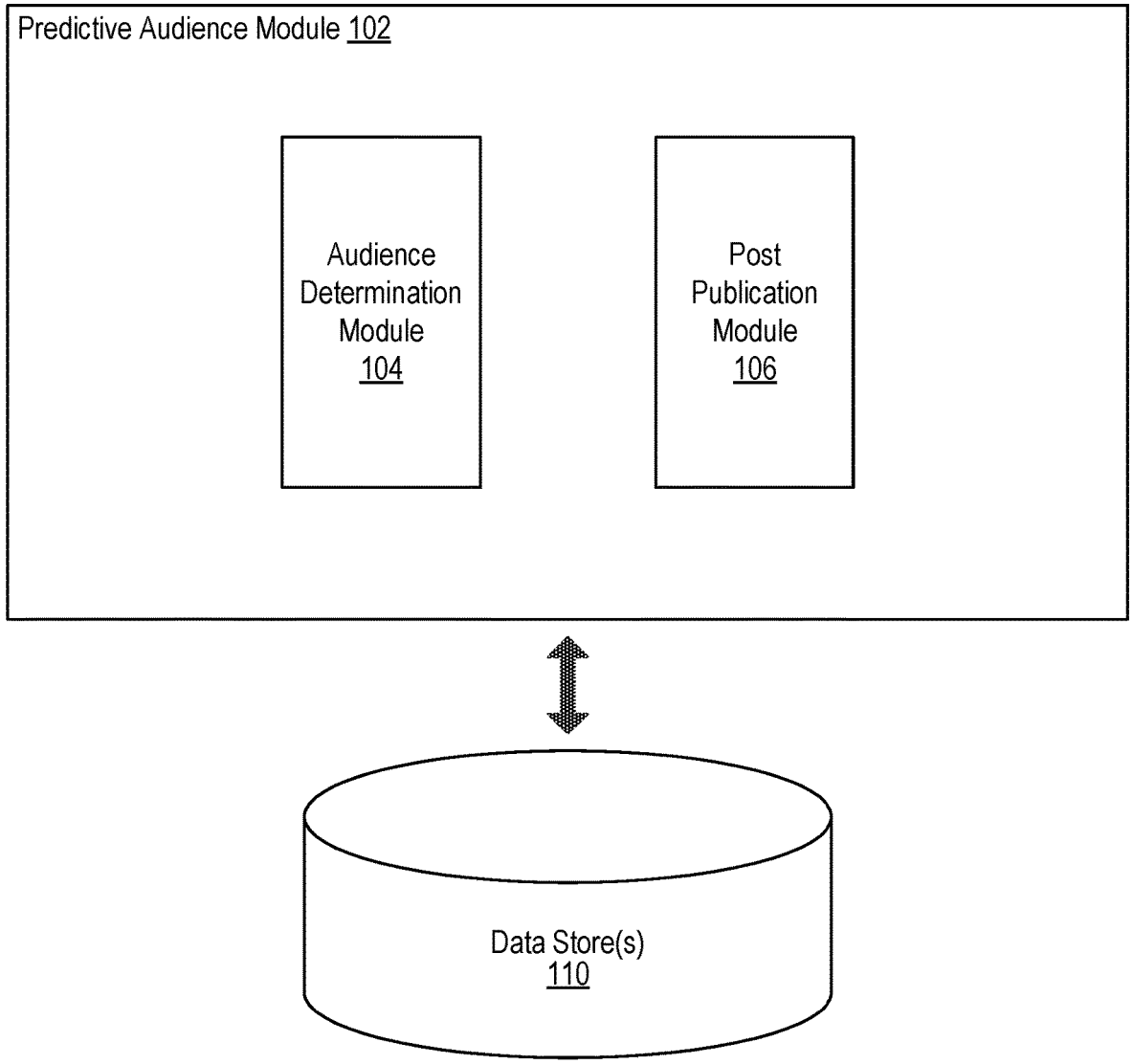
FIG. 1 illustrates an example system including a predictive audience module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Social Network Post Audience Prediction and Selection

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (i.e., a social networking service, a social network, etc.). For example, users can add friends or contacts, provide, post, or publish content items, such as text, notes, status updates, links, pictures, videos, and audio, via the social networking system.

As a user utilizes and interacts on a social networking system, the system receives and stores more information about a user and learns more about the user. The profile and interactions of the user as well as the profile and interactions of connections of the user can provide important information about the user. For example, interactions on a social networking system can provide information about what types of content are of interest and relevant to different users. Information regarding such interactions can be leveraged by the social networking system to optimize the presentation of relevant content, advertising, and other services to the user to enhance the user's experience.

It continues to be an important interest for a social networking system rooted in computer technology to encourage users to interact more frequently. More frequent interaction by a user on the social networking system, such as posting content to the social networking system, allows the social networking system to gather more information about the user. This information can be used to enhance a user's experience by tailoring presentation of content to that content which is most relevant to the user. However, the user may be hesitant to post information to the social networking system that may not have broad appeal, so as not to alienate or bore potential viewers. The user may also be hesitant to post information to the social networking system that the user wishes to share only with a limited subset of viewers.

Therefore, an improved approach can be beneficial for overcoming these and other disadvantages associated with conventional approaches. Based on computer technology, the disclosed technology can predict a predicted relevant audience for a post on a social networking system, i.e., a social network post, and allow the poster of the social network post to select a selected audience for the social network post. User social network interaction information, along with other available information, can be utilized to determine potential viewers that may be interested in the social network post and have a higher likelihood of engaging with or interacting with the social network post. Further information may be utilized to rank and filter the potential viewers based on various criteria. The ranking of the potential viewers may be utilized to predict the relevant audience for the social network post. The predicted relevant audience can be presented to the poster, and the poster can confirm or revise the predicted relevant audience to select a selected audience for the social network post. The social network post can be presented to the selected audience based on consideration of various other factors. In this way, the disclosed technology allows users to easily select a relevant audience for a social network post based on predictive analysis.

FIG. 1 illustrates an example system 100 including an example predictive audience module 102 configured to facilitate prediction and selection of a relevant audience for a social network post, according to an embodiment of the present disclosure. The predictive audience module 102 can be configured to receive a social network post from a posting user (i.e., a poster) and analyze the social network post. The social network post can be analyzed for information that can be used to predict a relevant audience for the social network post. The predictive audience module 102 may be further configured to rank potential viewers of the social network post, and to determine a predicted relevant audience based on the ranking of the potential viewers. The predictive audience module 102 can be configured to give the poster an opportunity to select a selected audience, for example, by confirming or revising the predicted relevant audience. The social network post may be provided to members of the selected audience for viewing, or can be ranked among other social network posts for potential provision to members of the selected audience for viewing.

As shown in the example of FIG. 1, the predictive audience module 102 can include an audience determination module 104 and a post publication module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

The audience determination module 104 can be configured to facilitate predicting a relevant audience for a social network post and selection of a selected audience. For example, the audience determination module 104 can be configured to receive a social network post by a poster, and to analyze the social network post for information that may be relevant in determining a predicted relevant audience. Examples of such information may include geographic location information, content information, sentiment information, participant information, and the like. The audience determination module 104 can be configured to rank potential viewers based on various viewer ranking criteria. The audience determination module 104 may determine the predicted relevant audience based on the ranking of the potential viewers. The poster can be provided with the opportunity to select a selected audience by either confirming the predicted relevant audience, or revising the predicted relevant audience by selecting potential viewers to add or remove. Suggestions for potential viewers to add or remove may be provided by the audience determination module 104. Once the poster has finalized the selected audience, the selected audience may be provided to the post publication module 106. The audience determination module 104 is discussed in greater detail herein.

The post publication module 106 can be configured to provide a social network post to members of a selected audience. The post publication module 106 can be configured to receive a determination of a selected audience from the audience determination module 104, and to determine which members of the selected audience will be presented with the social network post. The post publication module 106 may consider various factors in making this determination. Such factors may include viewer preferences for each of the potential viewers in the selected audience, a news feed algorithm, as well as other considerations. The post publication module 106 is discussed in greater detail herein.

The predictive audience module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the predictive audience module 102 can be implemented, in part or in whole, as software running on one or more computing devices or systems, such as on a server computing system or a user (or client) computing system. For example, the predictive audience module 102 or at least a portion thereof can be implemented as or within an application (e.g., app), a program, or an applet, etc., running on a user computing device or a client computing system, such as the user device 610 of FIG. 6. In another example, the predictive audience module 102 or at least a portion thereof can be implemented using one or more computing devices or systems that include one or more servers, such as network servers or cloud servers. In some instances, the predictive audience module 102 can, in part or in whole, be implemented within or configured to operate in conjunction with a social networking system (or service), such as the social networking system 630 of FIG. 6. It should be understood that there can be many variations or other possibilities.

The predictive audience module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the predictive audience module 102. For instance, the data store 110 can store viewer preference information, news feed algorithm information, and any other information that may be used to carry out the present technology disclosed herein. It is contemplated that there can be many variations or other possibilities.

The predictive audience module 102 can implement a user interface displayed on a computing device associated with a poster, a viewer, or other user in accordance with the present technology. The user interface for each type of user can be designed to provide functionality tailored to and supportive of the particular role, actions, and preferences of each user. Features of the user interfaces for the users are described in more detail and in connection with the modules of the predictive audience module 102, as set forth herein. For example, when functionality, features, or actions (e.g., setting of preferences, selection of an audience, etc.) are described herein, it should be appreciated that the functionality, features, and actions are implemented or supported by an appropriate user interface.

Figure 2:
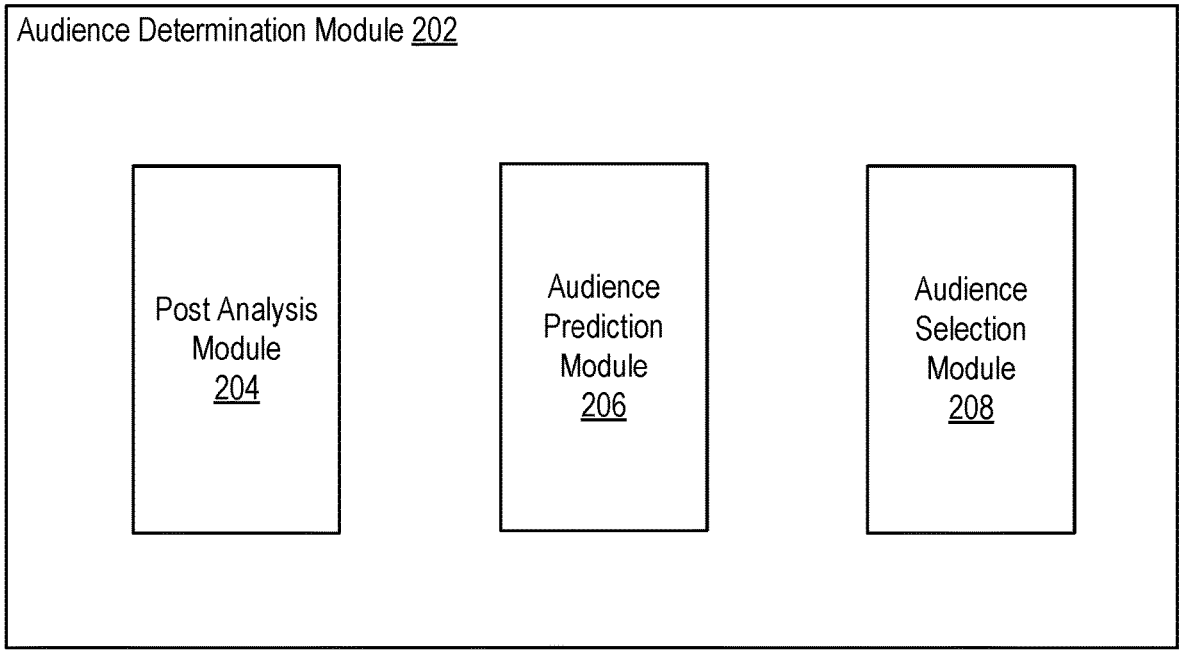
FIG. 2 illustrates an example audience determination module, according to an embodiment of the present disclosure.

FIG. 2 illustrates an example audience determination module 202 configured to determine an audience for a social network post, according to an embodiment of the present disclosure. In some embodiments, the audience determination module 104 of FIG. 1 can be implemented as the example audience determination module 202. As shown in FIG. 2, the audience determination module 202 can include a post analysis module 204, an audience prediction module 206, and an audience selection module 208.

The post analysis module 204 can be configured to analyze a social network post for information relevant to ranking potential viewers and determining a predicted relevant audience. For example, the post analysis module 204 may analyze a social network post for location information (e.g., geo-tags on a photograph, a tagged location, the location of the poster at the time of posting), participant information (e.g., people tagged in the social network post), content information (e.g., the topic of the social network post, the sentiment of the social network post, entities or events mentioned in the post, hashtags used in the post), and the like. This information may be obtained in a variety of ways, including word analysis, grammar analysis, image analysis of photographs or videos, audio analysis, and user provided information, such as tagging of locations or people by the poster. The information obtained by analyzing the social network post may be provided to the audience prediction module 206 so that it can be used to rank potential viewers and determine a predicted relevant audience for the social network post.

The audience prediction module 206 can be configured to predict a relevant audience for a social network post. In certain embodiments, the audience prediction module 206 can be configured to rank one or more potential viewers based on viewer ranking criteria. In certain embodiments, the set of potential viewers may be limited based on social graph information. For example, the set of potential viewers may be limited to direct connections of the poster on the social networking system, or indirect connections within a selected number of degrees of separation. In certain embodiments, the viewer ranking criteria can determine which users are most likely to be interested in the social network post and interact with the social network post. The viewer ranking criteria can also be configured to determine which potential viewers the poster would want to include or exclude from the audience of the social network post. A predicted relevant audience may be determined based on the ranking of the one or more potential viewers.

In certain embodiments, the viewer ranking criteria can be based on a potential viewer's potential interest in the social network post. Determination of a potential viewer's potential interest in the social network post may be based on various aspects of the social network post. For example, it may be determined that a potential viewer may have an interest in location information associated with the social network post (e.g., the social network post discusses a particular location, or is made from a particular location, or describes a particular location). In another example, the potential viewer may have an interest in various participants associated with the social network information (e.g., people tagged in the post). Other examples include substantive content information associated with the social network post (e.g., the potential viewer may have an interest in a particular activity or event discussed in the social network post) and sentiment information (e.g., the potential viewer may be more likely to interact with happy posts, or comical posts, or serious posts).

In order to determine whether a potential viewer would be interested in a social network post, it can be useful to have information regarding the interests of the potential viewer. A potential viewer's interests may be determined, at least in part, based on the potential viewer's past interactions on a social networking system. For example, a user may affirmatively identify interests by listing interests on the user's profile on the social networking system. A user's interests may also be inferred based on the user's interactions with content on the social networking system. For example, if a user consistently views, shares, or "likes" content involving hiking, it can be inferred that the user has an interest in hiking and will be interested in more social network posts involving hiking. Similarly, if a user consistently views, shares, or "likes" content involving a particular location, person, or topic, it can be inferred that the user has an interest in the location, person, or topic, respectively. In certain embodiments, the audience prediction module 206 can also be configured to suggest groups of users. For example, the social networking system can comprise groups of users associated with one or more traits, e.g., interests, topics, locations, etc. In another example, the social networking system can comprise one or more "channels" that are associated with general categories or topics, such as news, sports, comedy, teen, etc. The social networking system can also comprise communities that include users that share a one or more characteristics, e.g., living in the same location, attending the same school, etc. In various embodiments, the audience prediction module 206 can be configured to suggest groups of users based on groups, channels, and/or communities on a social networking system. Similar to the determination described immediately above with respect to individual users, the audience prediction module 206 can be configured to analyze social network posts and interactions associated with various groups, channels, and/or communities to identify interests of the groups, channels, and/or communities.

Privacy concerns may arise where posters are able to discern potential viewers' interests by observing which potential viewers are ranked highly for particular social network posts. For example, if a poster sees that a particular user is consistently included in the predicted relevant audience for conservative political posts, but not for liberal political posts, the poster may be able to determine that the particular user is politically conservative, even if the particular user has not made that information public. In certain embodiments, privacy protections may be implemented by limiting the social network interactions that can be used to determine a particular user's interests. For example, the determination of a particular user's interests may be based only on social network interactions that are visible to the poster (i.e., interactions which have not been hidden from the poster). In this way, the poster will not be able to draw any conclusions about a particular user's interests that have not already been made visible to the poster. Furthermore, in certain embodiments, an affordance can be provided to allow a poster to view why each user was included as a potential viewer. This feature would further reduce the perception that information may be inappropriately leaked when the poster is included as a potential viewer for another poster.

The viewer ranking criteria can also include consideration of a potential viewer's affinity with the poster of the social network post. In certain embodiments, a potential viewer's affinity with a poster may be based on a "friendship coefficient" which determines the affinity between two users. The friendship coefficient may take into account the quantity and quality of interactions between two users on the social networking system as well as friendship designations selected by the users (e.g., designating a particular user as a "close friend"). The viewer ranking criteria may prioritize potential viewers who have a greater friendship coefficient with the poster, indicating a greater affinity between the potential viewer and the poster. This viewer ranking criteria reflects a principle that potential viewers may be more interested in viewing content from posters they are closer to, rather than posters that they seldom interact with or have a less meaningful relationship with.

The viewer ranking criteria can also include consideration of the poster's past audience selections. As discussed in greater detail herein, the poster may be given the opportunity to select an audience by, for example, adding or removing potential viewers from the predicted relevant audience. If a poster consistently adds or consistently removes particular users, then the audience prediction module 206 can use this information in ranking potential viewers and determining a predicted relevant audience. For example, the audience prediction module 206 can assign a lower ranking for users consistently removed by the poster and a higher ranking for users consistently added by the poster. The audience prediction module 206 can analyze which types of posts were shared with particular groups of people, and make appropriate ranking decisions based on this information. For example, the audience prediction module 206 can analyze which types of posts the user historically shared with close family, and which types of posts were shared with all friends, and which types of posts were shared with other groups, and make appropriate determinations. The audience prediction module 206 can also be configured to learn from previous manual selections of audience members made by a user and to make appropriate determinations based on previous manual audience member selections made by the user.

Once potential viewers have been ranked based on the viewer ranking criteria, the audience prediction module 206 can be further configured to determine a predicted relevant audience based on the ranking of the potential viewers. In certain embodiments, this may be accomplished by selecting all potential viewers ranked above a ranking threshold (e.g., the top twenty potential viewers or the top fifty potential viewers). The ranking threshold, i.e., the size of the predicted relevant audience, may be determined by the poster or the social networking system. In some embodiments, the size of the predicted relevant audience may be determined based on analysis of the post by the post analysis module 204. For example, certain social network posts may be determined to be intended for a wider audience (e.g., a social network post relating to a national sporting event), while other social network posts may be determined to be intended for a smaller audience (e.g., a social network post relating to a neighborhood event).

In certain embodiments, the audience prediction module 206 can assign to each potential viewer an interest-level rating that reflects the level of interest in a social network post by each potential viewer. The interest-level rating can reflect the level of interest in a social network post by each potential viewer. The interest-level rating may be determined based on the viewer ranking criteria discussed above. The predicted relevant audience may be determined based on the interest-level rating. For example, all potential viewers who meet a certain interest-level threshold can be included in the predicted relevant audience. In certain embodiments, potential viewers may be ranked based on interest-level ratings, and a predicted relevant audience may be determined based on one or both of a ranking threshold or an interest-level threshold.

The audience selection module 208 can be configured to facilitate selection of an audience for a social network post. In certain embodiments, the audience prediction module 206 can provide a predicted relevant audience, which is then presented to the poster for confirmation or revision. By confirming or revising the predicted relevant audience, the poster can define a "selected audience," i.e., an audience that has been selected by the poster to view a social network post. The audience selection module 208 can be configured to allow the poster to view the predicted relevant audience, and to either confirm the predicted relevant audience, or to revise the predicted relevant audience by removing or adding potential viewers.

Revision of the predicted relevant audience may be carried out in a variety of ways. In one example, the poster may be presented with a ranked list of potential viewers based on the ranking performed by the audience prediction module 206. The predicted relevant audience may be a subset of the ranked list. The poster can expand or contract the selected audience by changing a ranking threshold. For example, if the predicted relevant audience comprises the top twenty ranked potential viewers, the user can increase the audience by increasing the ranking threshold to the top thirty ranked potential viewers, or decrease it to the top ten ranked potential viewers. In another example, if the predicted relevant audience comprises potential viewers satisfying an interest-level threshold, the poster can raise or lower the interest-level threshold. The audience selection module 208 may also be configured to allow the poster to select individual members that are in the predicted relevant audience and remove them, or to select individual members that are outside the predicted relevant audience and add them.

In certain embodiments, the audience selection module 208 can be configured to analyze the predicted relevant audience and/or the ranked list of potential viewers to offer suggestions as to potential viewers that can be added or removed. For example, if a large number of the predicted relevant audience share a particular trait or otherwise belong to a common category, the audience selection module 208 may inform the poster of this common category. The audience selection module 208 can ask the poster if he or she would like to include anyone who is a member of the common category. For example if eighteen of twenty potential viewers in the predicted relevant audience live in London, the audience selection module 208 can ask the poster if he or she would like to include all potential viewers who live in London, including those not currently in the predicted relevant audience. If the poster chooses to include additional potential viewers in the category in this way, the poster may be warned of potential viewers that have a low level of potential interest (e.g., below an interest-level threshold), but are being added to the selected audience because of the categorical selection. In another example, the audience selection module 208 may indicate that certain potential viewers are outside the predicted relevant audience despite having a relatively high level of potential interest (e.g., having an interest-level rating above an interest-level threshold). This may occur because potential viewers are outside a defined ranking threshold, but have a high interest-level rating. For example, potential viewers ranked 21, 22, and 23 may have a high interest-level rating, but may be excluded if the ranking threshold has been limited to twenty potential viewers. Once the poster has determined a selected audience, either by confirming the predicted relevant audience or revising it, the social network post can be provided to members of the selected audience for potential presentation.

Figure 3:
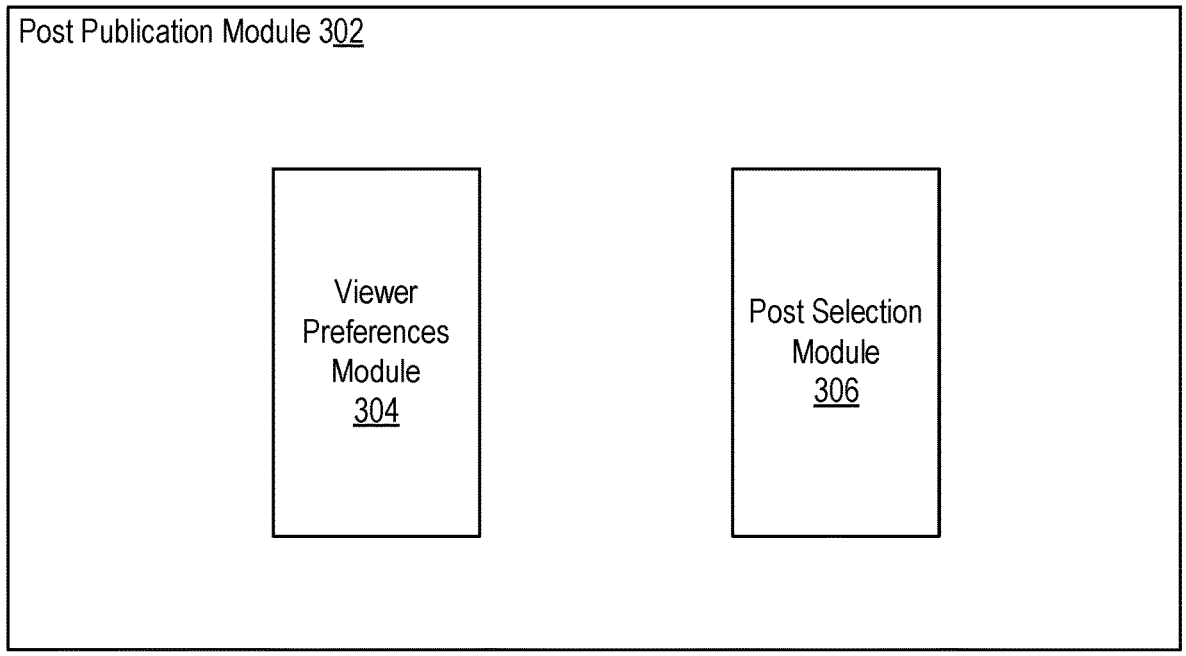
FIG. 3 illustrates an example post publication module, according to an embodiment of the present disclosure.

FIG. 3 illustrates an example post publication module 302 configured to publish social network posts to news feeds of various viewers, according to an embodiment of the present disclosure. In some embodiments, the post publication module 106 of FIG. 1 may be implemented as the example post publication module 302. As shown in FIG. 3, the post publication module 302 can include a viewer preferences module 304 and a post selection module 306.

The viewer preferences module 304 can be configured to receive viewer preferences for presentation of social network posts to the viewer. In certain embodiments, social network posts may be presented to a viewer in a news feed on a social networking system. The viewer preferences module 304 can be configured to receive preferences from a viewer that, along with other considerations, are used in determining which social network posts are presented in the viewer's news feed. Viewer preferences may be incorporated into a news feed algorithm to select content items for potential presentation in the viewer's news feed, as is discussed in greater detail herein.

The post selection module 306 can be configured to select social network posts identified from a news feed algorithm to select social network posts for presentation to a user in a news feed supported by the social networking system. The news feed algorithm can include a technique to identify relevant social network posts for all users of a social networking system. In one implementation, the news feed algorithm can train (and retrain) machine learning models for ranking social network posts for potential presentation in news feeds of users on a social networking system. For example, the news feed algorithm can divide its users into different sets based on various attributes of the users (e.g., age, ethnicity, income, language, etc.) and can generate one or more models for each set of users. Users with different attributes may have different behavioral patterns that can reflect their interests in different topics reflected by social network posts. As a result, different models for ranking social network posts for different sets of users can provide more accurate ranking of social network posts and provide higher likelihood that users will be interested in the topics reflected by the social network posts presented to them.

In accordance with the news feed algorithm, features used to train the models can include interactions of users with social network posts of a news feed. Such interactions can include, for example, selecting a link in the social network post, commenting on the social network post, liking the social network post, sharing the social network post, and hiding the social network post. The news feed algorithm can use the models for each set of users to determine levels of interest of a user in topics reflected by social network post. The level of interest of a user in each topic can be indicated by a topic score. The social networking system can rank a social network post for potential presentation to a user based on a topic(s) reflected by the social network post and the topic score(s) of the user for the topic(s). In some instances, an aggregate score can be determined for the user in connection with each social network post overall, and the social network posts can be ranked based on their aggregate scores. Social network posts having a ranking that satisfies a selected threshold value can be ultimately presented to the user in his or her news feed.

When a poster creates a social network post and selects an audience for the social network post, the post is provided to each member of the selected audience. For each member of the selected audience, a determination is made by the post selection module 306 as to whether or not the social network post will appear in the member's news feed, based on a news feed algorithm, as described herein. As discussed above, the news feed algorithm may take into account the member's viewer preferences that are specified explicitly or implied from the viewer's actions (e.g., selecting a link in a social network post, commenting on a social network post, liking a social network post, sharing a social network post, hiding a social network post).

In addition to taking into consideration viewer preferences of members of the selected audience, the post selection module 306 can also consider actions taken by the poster in determining whether or not a social network post is presented in the news feed of a member of the selected audience. For example, if a poster explicitly adds a particular user to the selected audience despite the fact that the particular user has a relatively low interest ranking or interest-level rating, the poster may be indicating that he or she would like that particular user to see the social network post. In this case, the social network post may be given higher priority for presentation in the particular user's news feed, so long as such presentation would not be directly adverse to the particular user's preferences, e.g., if the particular user has expressly indicated that he or she would not like to receive social network posts from the poster.

Figure 4:
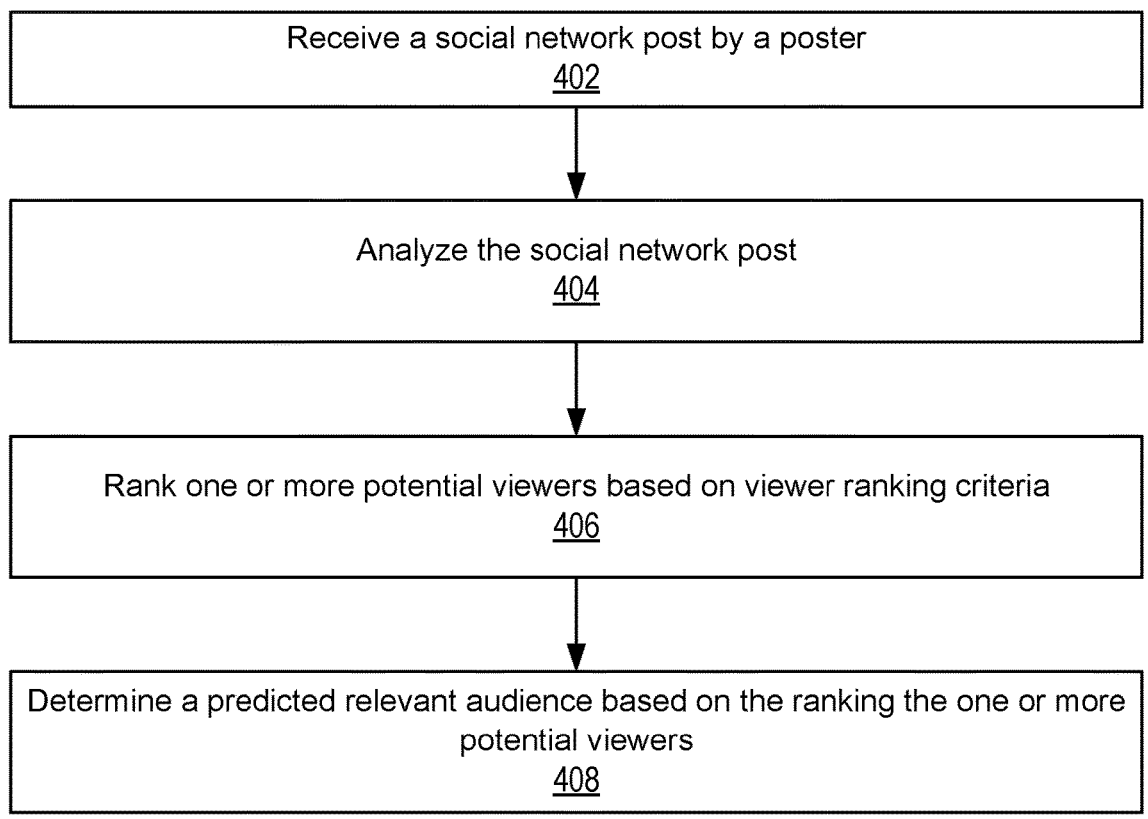
FIG. 4 illustrates an example method for predicting a relevant audience for a social network post on a social networking system, according to an embodiment of the present disclosure.

FIG. 4 illustrates an example method 400 associated with predicting a relevant audience for a social network post, according to an embodiment of the present disclosure. It should be appreciated that there can be additional, fewer, or alternative steps performed in similar or alternative orders, or in parallel, based on the various features and embodiments discussed herein unless otherwise stated.

At block 402, the example method 400 can receive a social network post by a poster. At block 404, the example method 400 can analyze the social network post. At block 406, the example method 400 can rank one or more potential viewers based on viewer ranking criteria. At block 408, the example method 400 can determine a predicted relevant audience based on the ranking the one or more potential viewers.

Figure 5:
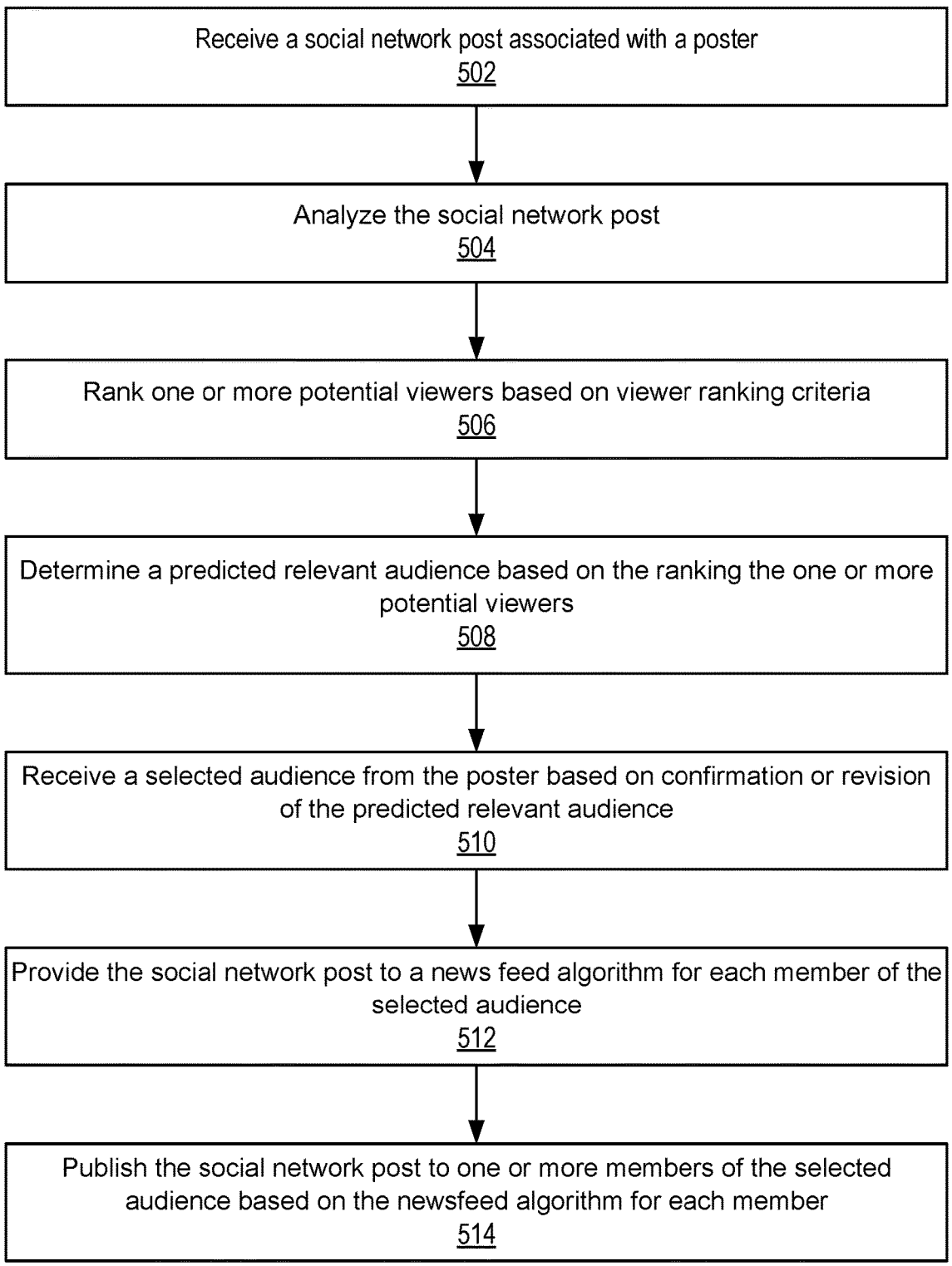
FIG. 5 illustrates an example method for publishing a social network post for viewing by a selected audience, according to an embodiment of the present disclosure.

FIG. 5 illustrates an example method 500 associated with publishing a social network post to a selected audience, according to an embodiment of the present disclosure. It should be appreciated that there can be additional, fewer, or alternative steps performed in similar or alternative orders, or in parallel, based on the various features and embodiments discussed herein unless otherwise stated.

At block 502, the example method 500 can receive a social network post associated with a poster. At block 504, the example method 500 can analyze the social network post. At block 506, the example method 500 can rank one or more potential viewers based on viewer ranking criteria. At block 508, the example method 500 can determine a predicted relevant audience based on the ranking the one or more potential viewers. At block 510, the example method 500 can receive a selected audience from the poster based on confirmation or revision of the predicted relevant audience. At block 512, the example method 500 can provide the social network post to a news feed algorithm for each member of the selected audience. At block 514, the example method 500 can publish the social network post to one or more members of the selected audience based on the news feed algorithm for each member.

Social Networking System—Example Implementation

Figure 6:
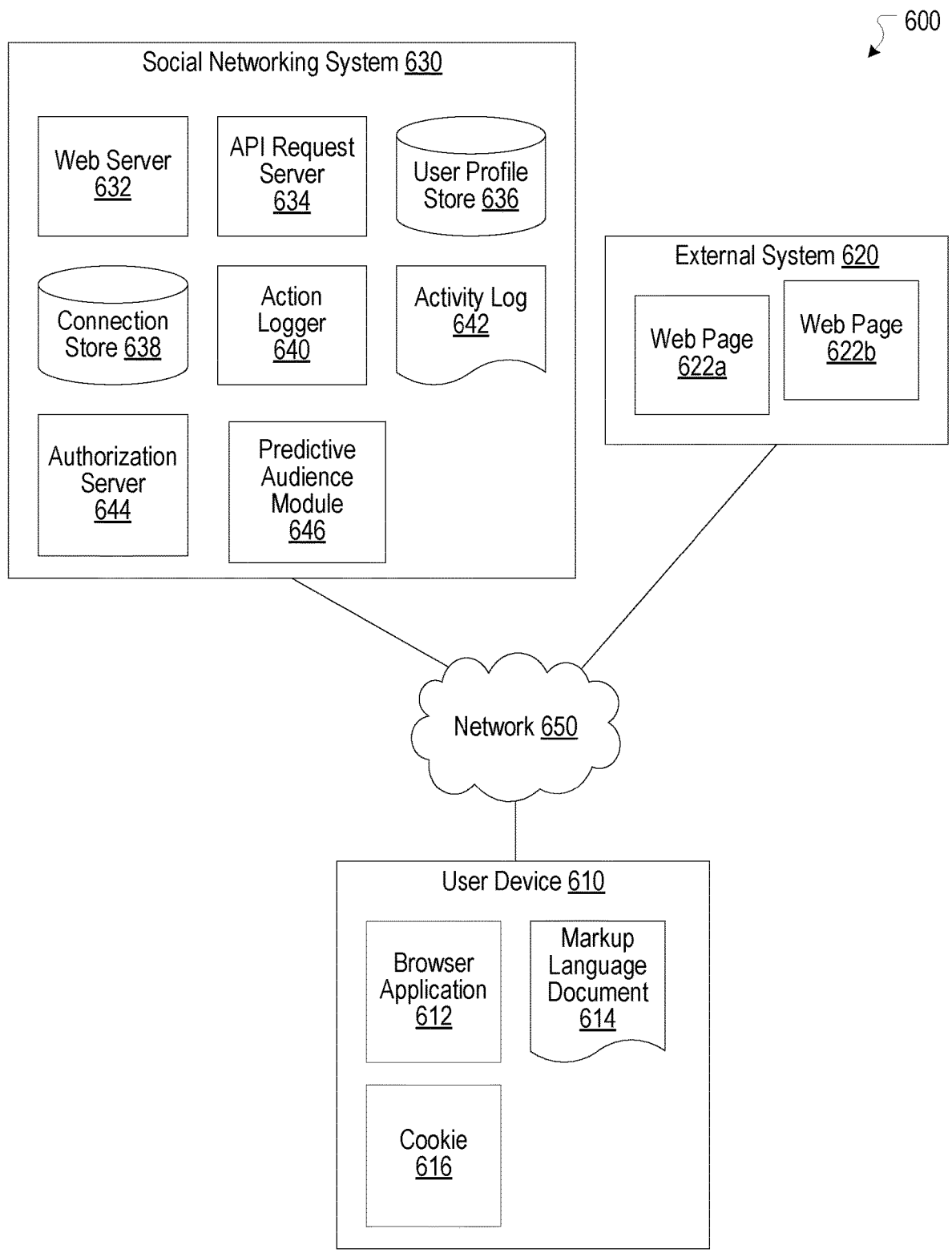
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a predictive audience module 646. The predictive audience module 646 can, for example, be implemented as the predictive audience module 102, as discussed in more detail herein. As discussed previously, it should be appreciated that there can be many variations or other possibilities. For example, in some embodiments, one or more functionalities of the predictive audience module 646 can be implemented in the user device 610.

Hardware Implementation

Figure 7:
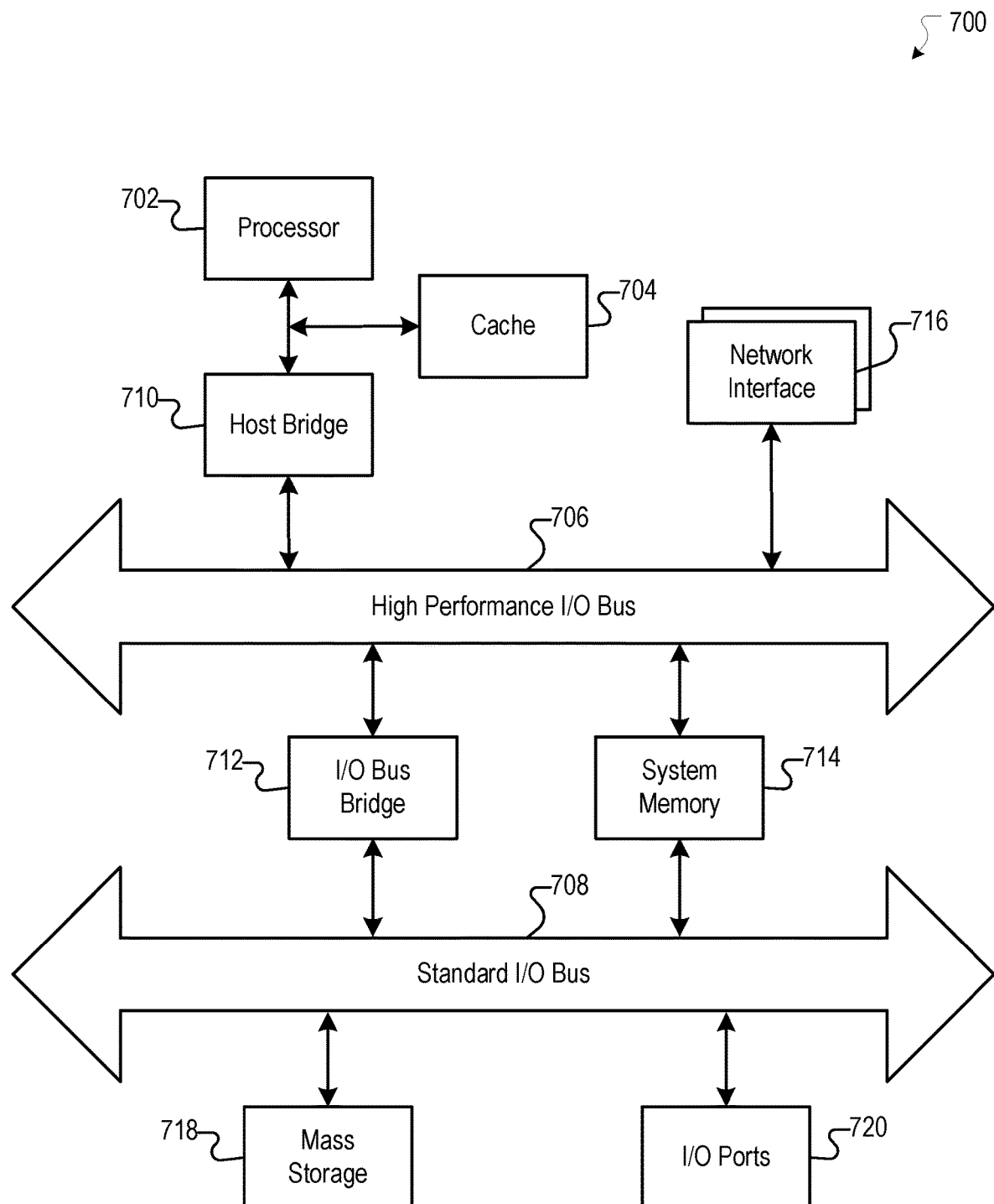
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    receiving, by a computing system, a post associated with a posting user;
    analyzing, by the computing system, the post for post information, wherein the post information includes at least one of: location information, content information, sentiment information, and participant information;
    ranking, by the computing system, potential viewers by interest-level ratings based on the post information and viewer ranking criteria, wherein the viewer ranking criteria includes a potential interest determination based on interactions of the potential viewers visible to the posting user, the interactions being limited based on privacy protections associated with the potential viewers and the posting user, and previous instances in which the posting user added or removed the potential viewers from previous selected audiences for one or more previous posts, the potential viewers that were added being ranked higher than the potential viewers that were removed;
    determining, by the computing system, a size of a predicted relevant audience based on the post information;
    providing, by the computing system, a set of the potential viewers that satisfy an interest-level ratings threshold associated with the ranking and a set of additional potential viewers of a common category associated with the potential viewers based on a number of the potential viewers being less than the size of the predicted relevant audience, wherein an affordance is provided that describes why the set of the potential viewers and the set of additional potential viewers were provided;
    determining, by the computing system, the predicted relevant audience based on the potential viewers that satisfy the interest-level ratings threshold and a selection of one or more additional potential viewers of the set of additional potential viewers;
    receiving, by the computing system, a selected audience for the post based on confirmation or revision of the predicted relevant audience by the posting user; and
    providing, by the computing system, the post to each user in the selected audience for inclusion in a news feed associated with each respective user.

2. The computer-implemented method of claim 1, wherein the interest-level ratings indicate levels of interest in the post by the potential viewers.

3. The computer-implemented method of claim 1, wherein the potential viewers are connections of the posting user within a threshold number of degrees of separation.

4. The computer-implemented method of claim 1, wherein the predicted relevant audience comprises each of the potential viewers ranked above the interest-level ratings threshold.

5. The computer-implemented method of claim 1, wherein the receiving the selected audience comprises revising the predicted relevant audience by changing the interest-level ratings threshold.

6. The computer-implemented method of claim 1, wherein the common category is determined based on a trait shared by the potential viewers.

7. The computer-implemented method of claim 1, wherein the set of additional potential viewers include the potential viewers that belong to the common category and that do not satisfy the interest-level ratings threshold.

8. The computer-implemented method of claim 1, wherein the viewer ranking criteria further includes a friendship coefficient.

9. The computer-implemented method of claim 1, wherein the providing the post is based on one or more machine learning models.

10. A system comprising:
    at least one processor; and
    a memory storing instructions that, when executed by the at least one processor, cause the system to perform a method comprising:
        receiving a post associated with a posting user;
        analyzing the post for post information, wherein the post information includes at least one of: location information, content information, sentiment information, and participant information;
        ranking potential viewers by interest-level ratings based on the post information and viewer ranking criteria, wherein the viewer ranking criteria includes a potential interest determination based on interactions of the potential viewers visible to the posting user, the interactions being limited based on privacy protections associated with the potential viewers and the posting user, and previous instances in which the posting user added or removed the potential viewers from previous selected audiences for one or more previous posts, the potential viewers that were added being ranked higher than the potential viewers that were removed;
        determining a size of a predicted relevant audience based on the post information;

providing a set of the potential viewers that satisfy an interest-level ratings threshold associated with the ranking and a set of additional potential viewers of a common category associated with the potential viewers based on a number of the potential viewers being less than the size of the predicted relevant audience, wherein an affordance is provided that describes why the set of the potential viewers and the set of additional potential viewers were provided;

determining the predicted relevant audience based on the potential viewers that satisfy the interest-level ratings threshold and a selection of one or more additional potential viewers of the set of additional potential viewers;

receiving a selected audience for the post based on confirmation or revision of the predicted relevant audience by the posting user; and providing the post to each user in the selected audience for inclusion in a news feed associated with each respective user.

11. The system of claim 10, wherein the interest-level ratings indicate levels of interest in the post by the potential viewers.

12. The system of claim 10, wherein the potential viewers are connections of the posting user within a threshold number of degrees of separation.

13. The system of claim 10, wherein the predicted relevant audience comprises each of the potential viewers ranked above the interest-level ratings threshold.

14. The system of claim 10, wherein the providing the post is based on one or more machine learning models.

15. A non-transitory computer-readable storage medium including instructions that, when executed by at least one processor of a computing system, cause the computing system to perform a method comprising:

receiving a post associated with a posting user;

analyzing the post for post information, wherein the post information includes at least one of: location information, content information, sentiment information, and participant information;

ranking one or more potential viewers by interest-level ratings based on the post information and viewer ranking criteria, wherein the viewer ranking criteria includes a potential interest determination based on interactions of the potential viewers visible to the posting user, the interactions being limited based on privacy protections associated with the potential viewers and the posting user, and previous instances in which the posting user added or removed the potential viewers from previous selected audiences for one or more previous posts, the potential viewers that were added being ranked higher than the potential viewers that were removed;

determining a size of a predicted relevant audience based on the post information;

providing a set of the potential viewers that satisfy an interest-level ratings threshold associated with the ranking and a set of additional potential viewers of a common category associated with the potential viewers based on a number of the potential viewers being less than the size of the predicted relevant audience, wherein an affordance is provided that describes why the set of the potential viewers and the set of additional potential viewers were provided;

determining the predicted relevant audience based on the potential viewers that satisfy the interest-level ratings threshold and a selection of one or more additional potential viewers of the set of additional potential viewers;

receiving a selected audience for the post based on confirmation or revision of the predicted relevant audience by the posting user; and providing the post to each user in the selected audience for inclusion in a news feed associated with each respective user.

16. The non-transitory computer-readable storage medium of claim 15, wherein the interest-level ratings indicate levels of interest in the post by the potential viewers.

17. The non-transitory computer-readable storage medium of claim 15, wherein the potential viewers are connections of the posting user within a threshold number of degrees of separation.

18. The non-transitory computer-readable storage medium of claim 15, wherein the predicted relevant audience comprises each of the potential viewers ranked above the interest-level ratings threshold.

19. The non-transitory computer-readable storage medium of claim 15, wherein the providing the post is based on one or more machine learning models.

* * * * *